United States Patent [19]

Wienhold et al.

[11] Patent Number: 4,489,869
[45] Date of Patent: Dec. 25, 1984

[54] BURGLAR PROOF CLAMP FOR CAR ROOF CARRIERS

[76] Inventors: Edgar K. Wienhold, 1100 Lamar Dr.; Donald Tomm, 436 Strathcona Ter., both of Kamloops, British Columbia, Canada

[21] Appl. No.: 465,547

[22] Filed: Feb. 10, 1983

[30] Foreign Application Priority Data

Nov. 23, 1982 [CA] Canada .................................. 416167

[51] Int. Cl.³ .......................... B60R 9/04; A44B 21/00
[52] U.S. Cl. .................................. 224/329; 224/321; 224/331; 24/494; 24/513
[58] Field of Search ............... 24/513, 519, 517, 541, 24/494; 224/330, 331, 329, 321

[56] References Cited

U.S. PATENT DOCUMENTS

| | | | |
|---|---|---|---|
| 152,989 | 7/1874 | Greenwood | 24/513 |
| 2,068,960 | 1/1937 | Northrup et al. | 224/329 |
| 2,473,764 | 6/1949 | Park | 24/513 |
| 2,613,020 | 10/1952 | Berry | 224/331 |
| 2,921,486 | 1/1960 | Burke | 24/494 |
| 3,301,512 | 1/1967 | Nyberg | 24/494 |
| 3,346,929 | 10/1967 | Webb | 24/494 |
| 3,525,461 | 8/1970 | Bronson | 224/331 |
| 3,792,805 | 2/1974 | Binding et al. | 224/329 |
| 4,180,010 | 12/1979 | McDermott et al. | 224/321 |

FOREIGN PATENT DOCUMENTS

| | | | |
|---|---|---|---|
| 172752 | 3/1952 | Australia | 224/321 |
| 730994 | 3/1966 | Canada | 224/331 |
| 2812085 | 10/1978 | Fed. Rep. of Germany | 224/331 |
| 933501 | 4/1948 | France | 224/331 |

*Primary Examiner*—Victor N. Sakran
*Attorney, Agent, or Firm*—Stanley E. Johnson; Richard J. Hicks

[57] ABSTRACT

A clamping device for locking articles onto the bar of a car top carrier, wherein the clamping device has a base member, a lever arm and a pair of links. The links are pivotally attached at opposite ends thereof respectively to the base and lever arm with the pivots spaced apart from one another and arranged so as to lock in an over-center article clamp down position. An article engaging member is secured to one of the link arms and projects therefrom beyond the lever arm adjacent one end of the same and a finger operable lever lock means is pivotally attached to the lever arm at the other end thereof and engageable with the other link for locking the lever arm in an article securing position. The base member and lever arm are channel-shaped members internested one within the other in an article locking position and have aligned apertures in such position for receiving a padlock to make the unit burglar proof.

6 Claims, 3 Drawing Figures

BURGLAR PROOF CLAMP FOR CAR ROOF CARRIERS

This invention relates to an over-center clamp down for removably anchoring articles to a support and primarily is intended for securing articles to car top carriers.

While the device, subject of the present invention is applicable to many different fields it will be described herein with reference to use as a hold down or clamp for retaining articles on the bar of a car top carrier.

The standard form of car top carrier consists of two spaced apart bars supported on the roof structure of a vehicle and anchored thereto by various different means, for example, clips engaging the water drain trough that extends along the longitudinal marginal edges of the roof top. Conventionally, the articles are anchored to the bar by means of ropes passing over the article or articles and tied to the roof top bar. Rope tie downs are unsafe and furthermore, unsecure, as they cannot be used to lock the article to the carrier.

A principal object of the present invention is to provide a quick, safe and burglar proof clamp to fasten articles to a car top carrier, such articles being boats, surf boards, trunks, etc.

In accordance with the present invention, there is provided a clamping device comprising a base member adapted to be secured to an article supporting carrier, a lever arm, a pair of link arms pivotally connected at opposite ends respectively to the base member and lever arm with the pivots thereof spaced apart from one another and so arranged as to lock in an over-center article clamp down position, an article engaging member secured to one of said link arms and projecting therefrom beyond the lever arm adjacent one end thereof and a finger operable lever lock means pivotally attached to the lever arm and engageable with the other link arm for locking the lever arm in an article securing position.

The invention is illustrated by way of example with reference to the accompanying drawings, wherein.

Figure 1:
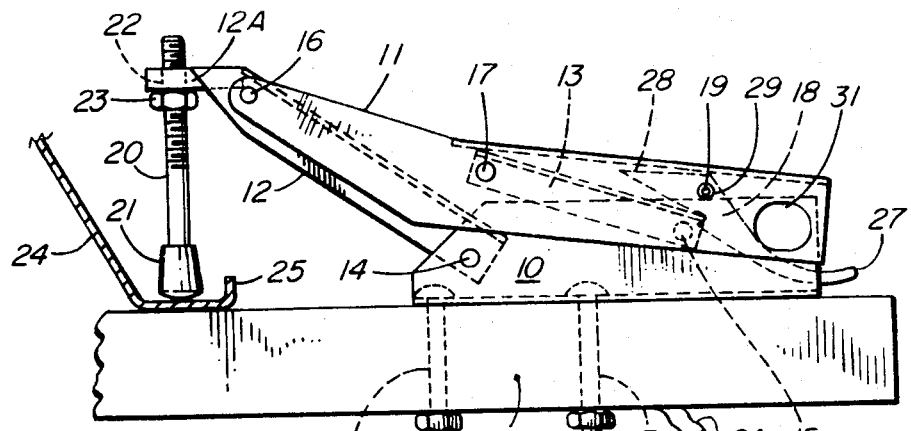
FIG. 1 is a side elevational view of a locking device constructed in accordance with the present invention shown in an article hold-down clamping position.
Figure 2:
FIG. 2 is a top plan view of FIG. 1.
Figure 3:
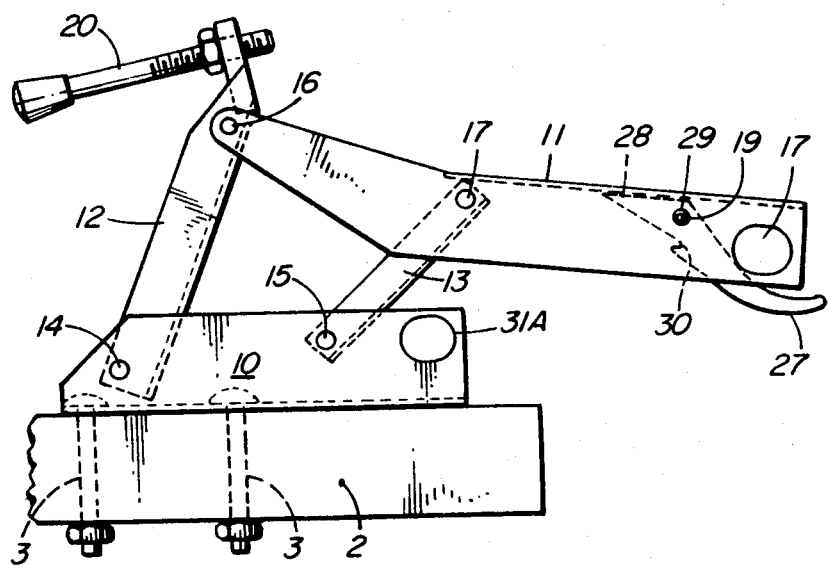
FIG. 3 is a side elevational view, the same as FIG. 1, but illustrating the clamp in an article release position.

Referring now to the drawings, there is illustrated therein an end portion of one cross-bar 2 on a roof top carrier secureable to the vehicle by a clamp designated generally 2a, one being located at each of opposite ends of the bar 2. A hold-down clamp, provided in accordance with the present invention is attached in any conventional manner, as for example, by a pair of bolts 3 to the bar 2. The hold-down clamp comprises a base member 10, a lever arm 11, a pair of link arms 12 and 13 pivotally connected at one end thereof by respective pivots 14 and 15 to the base 10, and at the other end by respective pivots 16 and 17 to the lever arm 11. From FIG. 1 it will be noted a line drawn through pivots 15 and 17 passes below pivot 16 thereby providing the over-center locking in an article hold-down position.

Link arm 12 has a portion 12a extending beyond one end of the lever arm 11 and a spring-loaded finger operable lever 18 is pivotally attached by pin 19 to the lever in the vicinity of the opposite end. The link arm extension is a thick metal bar that is secured as by welding to the channel shaped arm 12.

A threaded stem 20, having a resilient cap 21 at one end, threads into a threaded aperture 22 at the other end in the link arm extension 12a. A lock nut 23 anchors the threaded stem to the link arm. The threaded stem 20 in FIG. 1 is illustrated, anchoring an inverted fishing boat 24 to the car top carrier bar 2 by engaging the U-shaped gunnel 25 of the boat. The threads on the threaded stem 20 preferably should be of such a length that one cannot, by loosening lock nut 23, turn the stem sufficient to raise the resilient cap 21 above the uppermost outer edge of the U-shaped gunnel. The possibility however of someone trying to remove the anchored boat by doing so is rather remote because in most instances there would be insufficient room to move a wrench to loosen lock nut 23.

Lever 18 has a finger-engaging end 27 and an opposite end 28 on the other side of the pivot engageable in one position with the lever 17 and in the other position with the link 13. The safety lever 12 is biased to a locking position by means of a spring 29 normally to retain the end 28 in engagement with or adjacent the lever 13. The safety lever 18 has a notch 30 in the lower surface thereof for receiving an end portion of link 13 when the lever end 28 is in engagement with or adjacent the lever 11, thereby providing a safety lock in the clamp hold-down position. To make the assembly burglar proof, lever 11 and base 10 are provided with apertures 31 which are aligned in the article locking position. The locking arm of a padlock in the aligned apertures makes the clamp burglar proof.

The base 10, lever 11 and link arms 12 and 13 are all U-shaped in cross-section or channel members which in the locking position are internested, one within the other. Lever 11 is an inverted channel of suitable width to receive therein base 10, which is an upwardly directed channel. Link arms 12 and 13 fit within the space between the internested lever and base.

In the article locking position, notch 30 engages the web of the channel 13 and with having lever 18 spring biased, lever 11 is protected from being opened accidentally. Lifting lever 18, at the end 27, disengages notch 30 from the link 13 and lifting further causes end 28 to exert pressure on link arm 13, assisting in moving lever 11 over the over-center position. Lifting lever 11 upwardly lifts link arm 12 with the threaded stem 20 thereon out of the way, allowing the article to be removed or installed. Stem 20 being threaded provides adjustment means for clamping articles of different thickness. Normally four of the foregoing clamping devices will be used to secure an article, for example an inverted boat, to the bars of a car top carrier. Two of the clamping devices are secured to one bar of the car top carrier at spaced apart positions thereon and the other two to the other bar.

The embodiments of the invention in which an exclusive property or privilege is claimed are defined as follows:

1. A clamping device for securing an article to a car top carrier comprising a base member adapted to be secured to said carrier, a lever arm, a pair of link arms each pivotally connected at opposite ends respectively to the base member and lever arms with the pivot axes thereof spaced apart from one another and so arranged as to lock in an over-center article clamp down position, an article engaging member secured to one of said link arms, said article engaging member being selectively variable in length and projecting downwardly to press an article on the carrier against said carrier and a finger operable lever lock means pivotally attached to the lever arm and engageable with the other link arm for locking the lever arm in an article securing position.

2. A clamping device as defined in claim 1, wherein each of said base member and lever arm are channel-shaped members, said members being disposed in face-to-face relation and internested one within the other in an article clamping position.

3. A clamping device as defined in claim 2, wherein said link arms are confined within the channel-shaped base member and lever arm.

4. A clamping device as defined in claim 2, including apertures in said base member and lever arm aligned with one another in an article clamping position for receiving a padlock locking arm.

5. A clamping device as defined in claim 1, wherein said article engaging member comprises a rod adjustably mounted on said one link arm.

6. A clamping device as defined in claim 1, wherein said lever lock is spring-biased to link arm locking position.

* * * * *